US011852642B2

(12) United States Patent
NarasimhaMurthy et al.

(10) Patent No.: US 11,852,642 B2
(45) Date of Patent: Dec. 26, 2023

(54) METHODS AND APPARATUS FOR HILN DETERMINATION WITH A DEEP ADAPTATION NETWORK FOR BOTH SERUM AND PLASMA SAMPLES

(71) Applicant: Siemens Healthcare Diagnostics Inc., Tarrytown, NY (US)

(72) Inventors: Venkatesh NarasimhaMurthy, Hillsborough, NJ (US); Vivek Singh, Princeton, NJ (US); Yao-Jen Chang, Princeton, NJ (US); Benjamin S. Pollack, Jersey City, NJ (US); Ankur Kapoor, Plainsboro, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 295 days.

(21) Appl. No.: 17/278,285

(22) PCT Filed: Sep. 19, 2019

(86) PCT No.: PCT/US2019/052012
§ 371 (c)(1),
(2) Date: Mar. 19, 2021

(87) PCT Pub. No.: WO2020/061369
PCT Pub. Date: Mar. 26, 2020

(65) Prior Publication Data
US 2021/0334972 A1 Oct. 28, 2021

Related U.S. Application Data

(60) Provisional application No. 62/733,985, filed on Sep. 20, 2018.

(51) Int. Cl.
*G06T 7/00* (2017.01)
*G01N 35/00* (2006.01)
(Continued)

(52) U.S. Cl.
CPC ... *G01N 35/00732* (2013.01); *G06F 18/2431* (2023.01); *G06T 7/0014* (2013.01);
(Continued)

(58) Field of Classification Search
CPC .... G01N 35/00732; G01N 2035/00752; G06F 18/2431; G06T 7/0014; G06T 2207/20081;
(Continued)

(56) References Cited

U.S. PATENT DOCUMENTS 7,198,955 B1 * 4/2007 Samsoondar ........ G01N 33/721
436/175
2007/0222973 A1 * 9/2007 Hoshiko .......... G01N 35/00603
356/436
2016/0349237 A1 * 12/2016 Klinec .................. G01N 21/31

FOREIGN PATENT DOCUMENTS

CN 108139320 A 6/2018
JP 2012-008100 A 1/2012
(Continued)

OTHER PUBLICATIONS

Huang, G. et al. "Densely Connected Convolutional Networks". Jul. 21-26, 2017; <URL:http://openaccess.thecvf.com/content_cvpr_2017/papers/Huang_Densely_Connected_Convolutional_CVPR_2017_paper.pdf> figure1; p. 1, paragraph 1. (Year: 2017).*
(Continued)

*Primary Examiner* — Van D Huynh

(57) ABSTRACT

A method of characterizing a serum or plasma portion of a specimen in a specimen container provides an HILN (hemolysis, icterus, lipemia, normal) determination. Pixel data of an input image of the specimen container is processed by a classification network to identify whether the specimen contains plasma or serum. Pixel data representing a plasma sample are forwarded to a segmentation/classification/regression network trained with plasma samples for HILN
(Continued)

determination. Pixel data representing a serum sample are forwarded to a transformation network, wherein the serum sample pixel data is transformed into pixel data that matches pixel data of a corresponding previously-collected plasma sample by changing sample color, contrast, intensity, and/or brightness. The transformed serum sample pixel data are forwarded to the segmentation/classification/regression network for HILN determination. Quality check modules and testing apparatus configured to carry out the method are also described, as are other aspects.

21 Claims, 9 Drawing Sheets

(51) Int. Cl.
    *G06F 18/2431*     (2023.01)
    *G06V 10/764*     (2022.01)
    *G06V 10/82*     (2022.01)

(52) U.S. Cl.
    CPC ............ *G06V 10/764* (2022.01); *G06V 10/82* (2022.01); *G06T 2207/20081* (2013.01); *G06T 2207/20084* (2013.01); *G06T 2207/30024* (2013.01)

(58) Field of Classification Search
    CPC . G06T 2207/20084; G06T 2207/30024; G06T 7/0012; G06V 10/764; G06V 10/82; G01J 2003/102; G01J 2003/106; G01J 2003/2826
    USPC ........................................................ 382/128
    See application file for complete search history.

(56) References Cited

FOREIGN PATENT DOCUMENTS

| WO | 2017132162 | A1 | | 8/2017 | |
|----|------------|----|----|--------|----|
| WO | 2018/022280 | A1 | | 2/2018 | |
| WO | WO-2018022280 | A1 | * | 2/2018 | ............. G01N 21/25 |
| WO | 2018/089938 | A1 | | 5/2018 | |
| WO | WO-2018089938 | A1 | * | 5/2018 | ............. B01L 9/523 |
| WO | 2019/241128 | A1 | | 12/2019 | |
| WO | 2019/241134 | A1 | | 12/2019 | |

OTHER PUBLICATIONS

Extended EP Search Report dated Oct. 5, 2021 of corresponding European Application No. 19861573.4, 4 Pages.

Alon Hazan et al: "AdapterNet—learning 1-15 input transformation for domain adaptation", arxiv.org, Cornell University Library, 201 Olin Library Cornell University Ithaca, NY 14853, May 29, 2018 (May 29, 2018), XP080883750, pp. 1-7.

PCT International Search Report and Written Opinion dated Dec. 11, 2019 (9 Pages).

Huang, G. et al. "Densely Connected Convolutional Networks". Jul. 21-26, 2017; <URL:http://openaccess.thecvf.com/content_cvpr_2017/papers/Huang_Densely_Connected_Convolutional_CVPR_2017_paper.pdf> figure1; p. 1, paragraph 1.

Demirci, F. et al. "Artificial Neural Network Approach in Laboratory Test Reporting" Am J Clin Pathol Aug. 2016; 146:227-237, Jul. 27, 2016. <DOI: 10.1093/AJCP/AQW104>, entire document.

Deshpande, Adit "A Beginner's Guide To Understanding Convolutional Neural Networks Part 1" Sep. 2016, pp. 1-23; https://www.kdnuggets.com/2016/09/beginners-guide-understanding-convolutional-neural-networks-part-1.html.

Deshpande, Adit "A Beginner's Guide To Understanding Convolutional Neural Networks Part 2" Jul. 29, 2016, pp. 1-12; https://www.kdnuggets.com/2016/09/beginners-guide-understanding-convolutional-neural-networks-part-2.html/2.

Jegou, S. et al. "The One Hundred Layers Tiramisu: Fully Convolutional DenseNets for Semantic Segmentation" arXiv:1611.09326v3 [cs.CV] Oct. 31, 2017.

Simonyan, K. et al., "Very Deep Convolutional Networks for Large-Scale Image Recognition" Visual Geometry Published as a conference paper at ICLR 2015; arXiv:1409.1556v6 [cs.CV] Apr. 10, 2015, pp. 1-14.

GAN: A Beginner's Guide to Generative Adversarial Networks, 2017, pp. 1-22.

Goodfellow, I. et al., "Ggenerative Adversarial Nets" Department d'informatique et de recherche operationnelle, Universite de Montreal, Montreal, QC H3C 3J7, pp. 1-9, Jun. 10, 2014.

* cited by examiner

METHODS AND APPARATUS FOR HILN DETERMINATION WITH A DEEP ADAPTATION NETWORK FOR BOTH SERUM AND PLASMA SAMPLES

CROSS REFERENCE TO RELATED APPLICATION

This application claims the benefit of U.S. Provisional Patent Application No. 62/733,985, filed Sep. 20, 2018, the disclosure of which is hereby incorporated by reference in its entirety for all purposes.

FIELD

This disclosure relates to methods and apparatus for characterizing a specimen container (and specimen therein) in an automated diagnostic analysis system.

BACKGROUND

Automated diagnostic analysis systems may conduct assays or clinical analyses using one or more reagents to identify an analyte or other constituent in a specimen such as urine, blood serum, blood plasma, interstitial liquid, cerebrospinal liquid, and the like. Such specimens are usually contained within specimen containers (e.g., specimen collection tubes). The testing reactions generate various changes that may be read and/or manipulated to determine a concentration of an analyte or other constituent in the specimen.

Improvements in automated testing technology have been accompanied by corresponding advances in pre-analytical specimen preparation and handling such as sorting, batch preparation, centrifuging of specimen containers to separate specimen components, cap removal to facilitate fluid access, pre-screening for HILN (hemolysis, icterus, and/or lipemia, or normal) categorization, and the like by automated specimen preparation systems called Laboratory Automation Systems (LASs). LASs may also automatically transport a specimen in a specimen container to a number of specimen processing stations such that various operations (e.g., pre-analytical or analytical testing) may be performed thereon.

LASs may handle a number of different specimens contained in standard, barcode-labeled specimen containers, which may be of different sizes (e.g., diameters and heights). The barcode label may contain an accession number that may contain or be correlated to patient information and other information that may have been entered into a hospital's Laboratory Information System (LIS) along with test orders. An operator may place the labeled specimen containers onto the LAS system, which may automatically route the specimen containers for pre-analytical operations such as centrifugation, de-capping, and/or aliquot preparation before the specimen is subjected to clinical analysis or assaying by one or more analyzers (e.g., clinical chemistry or assaying instruments), which may also be part of the LAS.

For certain tests, a biological liquid such as a serum or plasma portion (obtained from whole blood by centrifugation) may be analyzed. Where the specimen is whole blood, a gel separator may be added to the specimen container to aid in the separation of a settled blood portion from the serum or plasma portion. After pre-processing, the specimen container may be transported to an appropriate analyzer that may extract a portion of the biological fluid (e.g., the serum or plasma portion) from the specimen container and combine the fluid with one or more reagents and possibly other materials in a reaction vessel (e.g., a cuvette). Analytical measurements may then be performed via photometric or fluorometric absorption readings. The measurements allow determination of end-point rate or other values, from which an amount of an analyte or other constituent in the biological fluid is determined using well-known techniques.

However, the presence of any interferent (e.g., hemolysis, icterus, and/or lipemia) in the specimen, which may result from a patient condition or sample processing, may adversely affect test results of the analyte or constituent measurement obtained from the one or more analyzers. For example, the presence of hemolysis (H) in the specimen, which may be unrelated to a patient's disease state, may cause a different interpretation of the disease condition of the patient. Moreover, the presence of icterus (I) and/or lipemia (L) in the specimen may also cause a different interpretation of the disease condition of the patient.

In some systems, a skilled laboratory technician may visually inspect and rate the integrity of the serum or plasma portion of the specimen as either normal (N) or as having a degree of H, I, and/or L (e.g., by assigning an index). This may involve a review of the color of the serum or plasma portion against known standards. However, such manual visual inspection is very subjective, labor intensive, and fraught with possible human error.

Because manual inspection may be problematic, efforts have been made to evaluate specimen integrity without the use of visual inspection by a laboratory technician, but instead by using an automated machine-vision inspection apparatus, wherein such evaluation takes place during pre-analytical testing (hereinafter "pre-screening"). The pre-screening involves automated detection of an interferent, such as H, I, and/or L, in a serum or plasma portion obtained from whole blood by fractionation (e.g., by centrifugation).

However, satisfactory images of specimen samples to be provided to automated machine-vision inspection apparatus may be difficult to obtain because, e.g., the above-described barcode-labels may be affixed directly on the specimen container. Such labels may partially occlude and obscure certain lateral viewpoints of the specimen, so that there may be some orientations that do not provide a clear opportunity to visually observe the serum or plasma portion. Thus, only a small portion of the serum or plasma portion may be visible, so that any H, I, and/or L, or N reading taken on the serum or plasma portion may not involve a high level of confidence.

Furthermore, collecting and annotating a large volume of both plasma and serum sample images to train an automated machine-vision inspection apparatus to suitably determine an HILN presence in a specimen sample may be very time consuming and expensive.

Accordingly, there is an unmet need for improved and cost effective methods and apparatus for characterizing a plasma or serum portion of a specimen in order to determine a presence, and in some cases a degree of, hemolysis (H), icterus (I), and/or lipemia (L), or whether the serum or plasma portion of the specimen is normal (N).

SUMMARY

According to a first aspect, a method of characterizing a specimen container is provided. The method includes processing pixel data of an image of a specimen container containing a specimen therein to determine whether the specimen container includes a serum portion or a plasma portion using a classification network executing on a computer. The method also includes transforming pixel data of an image determined by the classification network to include a serum portion into transformed-pixel data that matches pixel data of a previously-collected image of a plasma portion having an appearance that corresponds to an appearance of the serum portion without affecting any HILN (hemolytic, icteric, lipemic, and normal) characteristics present in the pixel data of the image using a transformation network executing on the computer.

According to another aspect, a quality check module is provided. The quality check module includes one or more image capture devices operative to capture one or more images from one or more viewpoints of a specimen container containing a specimen therein. The quality check module also includes a computer coupled to the one or more image capture devices. The computer is configured and operative to process pixel data of a captured image of the specimen container using a classification network executing on the computer to determine whether the specimen container includes a serum portion or a plasma portion. The computer is also configured and operative to transform pixel data of a captured image determined by the classification network to include a serum portion into transformed-pixel data that matches pixel data of a previously-collected image of a plasma portion having an appearance that corresponds to an appearance of the serum portion without affecting any HILN (hemolytic, icteric, lipemic, and normal) characteristics present in the pixel data of the image using a transformation network executing on the computer. The computer is further configured and operative to process the transformed-pixel data to determine an HILN category of the serum portion using a segmentation/classification/regression network executing on the computer. The computer is still further configured and operative to output from the segmentation/classification/regression network using the interface module a determined HILN category for each captured image having pixel data processed by the segmentation/classification/regression network.

In a further aspect, a specimen testing apparatus is provided. The specimen testing apparatus includes a track, a carrier moveable on the track, a plurality of image capture devices arranged around the track, and a computer coupled to the plurality of image capture devices. The carrier is configured to contain a specimen container containing a specimen therein, and the plurality of image capture devices is operative to capture one or more images from one or more viewpoints of the specimen container and the specimen. The computer includes an interface module and is configured and operative to process pixel data of a captured image of the specimen container to determine whether the specimen container includes a serum portion or a plasma portion using a classification network executing on the computer. The computer is also configured and operative to transform pixel data of a captured image determined by the classification network to include a serum portion into transformed-pixel data that matches pixel data of a previously-collected image of a plasma portion having an appearance that corresponds to an appearance of the serum portion without affecting any HILN (hemolytic, icteric, lipemic, and normal) characteristics present in the pixel data of the image using a transformation network executing on the computer. The computer is further configured and operative to process the transformed-pixel data to determine an HILN category of the serum portion using a segmentation/classification/regression network executing on the computer. The computer is still further configured and operative to output from the segmentation/classification/regression network using the interface module a determined HILN category for each captured image having pixel data processed by the segmentation/classification/regression network.

In a still further aspect, another method of characterizing a specimen container is provided. The method includes transforming pixel data, using a transformation network executing on a computer, of an image of a specimen container into transformed-pixel data, wherein the specimen container contains a specimen therein, the specimen has a serum portion or a plasma portion, and the transformation network minimizes or normalizes appearance differences between images of serum portions and images of plasma portions without affecting any HILN (hemolytic, icteric, lipemic, and normal) characteristics present in the pixel data of the image.

Still other aspects, features, and advantages of this disclosure may be readily apparent from the following description and illustration of a number of example embodiments and implementations, including the best mode contemplated for carrying out the invention. This disclosure may also be capable of other and different embodiments, and its several details may be modified in various respects, all without departing from the scope of the invention. This disclosure is intended to cover all modifications, equivalents, and alternatives falling within the scope of the claims.

BRIEF DESCRIPTION OF THE DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

DETAILED DESCRIPTION

Figure 1:
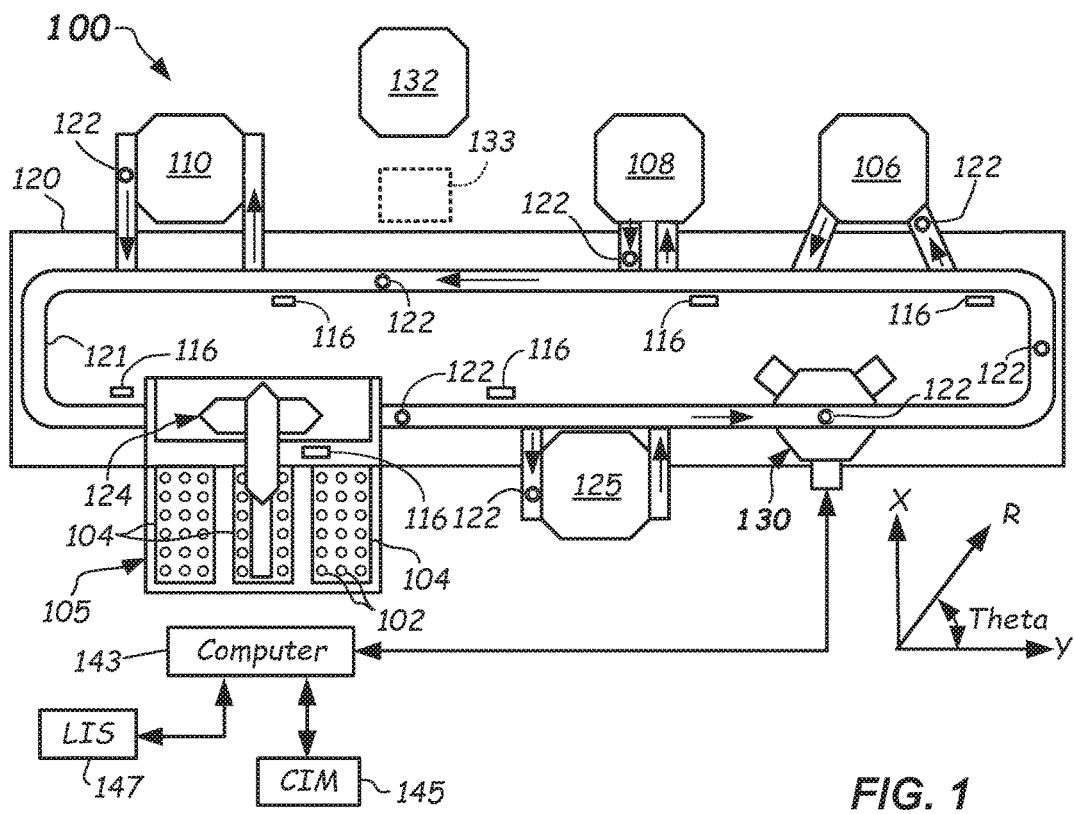
FIG. 1 illustrates a top schematic view of a specimen testing apparatus including one or more quality check modules configured to carry out HILN determination methods according to one or more embodiments.

During pre-screening of a specimen contained in a specimen container, a method is provided in accordance with embodiments that determines the presence and, in some embodiments, the degree of an interferent in a serum or plasma portion of the specimen. The serum or plasma portion may be the liquid component of blood and may be found above the settled blood portion after fractionation (e.g., by centrifugation). The settled blood portion may be a packed semi-solid made up of blood cells such as white blood cells (leukocytes), red blood cells (erythrocytes), and platelets (thrombocytes). Plasma and serum may differ from each other in the content of coagulating components, primarily fibrinogen. Plasma may be the unclotted liquid, whereas serum may refer to blood plasma that has been allowed to clot either under the influence of endogenous enzymes or exogenous components. An interferent, such as hemolysis (H), icterus (I), or lipemia (L), or a determination of normal (N) (hereinafter "HILN"), as used herein refers to the presence of at least one of H, I, and/or L in the serum or plasma portion of the specimen. Normal (N) may be defined as a serum or plasma portion that includes acceptably low amounts of H, I, and L. Hemolysis may be defined as a condition in the serum or plasma portion wherein red blood cells are destroyed during processing, which leads to the release of hemoglobin from the red blood cells into the serum or plasma portion such that the serum or plasma portion takes on a reddish hue. The degree of hemolysis may be quantified by assigning a hemolytic index. Icterus may be defined as a condition of the blood where the serum or plasma portion is discolored dark yellow, caused by an accumulation of bile pigment (bilirubin). The degree of icterus may be quantified by assigning an Icteric Index. Lipemia may be defined as a presence in the blood of an abnormally high concentration of emulsified fat, such that the serum or plasma portion has a whitish or milky appearance. The degree of lipemia may be quantified by assigning a Lipemic Index.

The specimen may be collected in a specimen container, such as a blood collection tube, and may include a settled blood portion and a serum or plasma portion after fractionation (e.g., separation by centrifugation). In some specimen containers, a gel separator may be used, which positions itself between the settled blood portion and the serum or plasma portion during centrifugation. The gel separator serves as a physical barrier between the two portions (liquid and semi-solid, settled blood cells), and may minimize remixing thereof. The specimen containers may be of different sizes and thus may be supplied for pre-screening and to the analyzers in a number of different configurations. For example, the specimen containers may have sizes such as 13 mm×75 mm, 13 mm×100 mm, 16 mm×100 mm, and 16 mm×125 mm. Other suitable sizes may be used. Should the specimen be found to contain one or more of H, I, and L, a suitable notice may be provided to the operator, and/or the specimen container may be taken off line (1) to perform a remediation to rectify the one or more of the H, I, or L, (2) to redraw the specimen, or (3) to perform other processing. Thus, the ability to pre-screen for HILN, such as at the first possible instance after centrifugation, and before analysis by one or more analyzers, may advantageously (a) minimize time wasted analyzing specimens that are not of the proper quality for analysis, (b) may avoid or minimize erroneous test results, (c) may minimize patient test result delay, and/or (d) may avoid wasting of patient specimen.

The method in accordance with embodiments may determine just an HILN category (e.g., "H" or "I" or "L" or "N") or a degree or sub-class of H (e.g., H0-H6 in some embodiments and more or less in other embodiments), a degree or sub-class of I (e.g., I0-I6 in some embodiments and more or less in other embodiments), and/or a degree or sub-class of L (e.g., L0-L4 in some embodiments and more or less in other embodiments). In some embodiments, the method may include an uncentrifuged (U) category for a specimen that has not been centrifuged. In addition, the method may classify (or "segment") various regions of the specimen container and specimen, such as a serum or plasma portion, a settled blood portion, a gel separator (if used), air, a label, a type of specimen container (indicating, e.g., height and width/diameter), and/or a type and/or color of a specimen container cap. A specimen container holder or background may also be classified. Differentiation of the serum and plasma portion from the region comprising one or more labels on the specimen container may be a particularly vexing problem, because one or more labels may wrap around the specimen container to various degrees. Thus, the one or more labels may obscure one or more views, such that a clear view of the serum or plasma portion may be difficult to obtain.

Thus, classification of the serum or plasma portion may be challenging due to interference from the one or more labels, whose placement may vary substantially from one specimen container to the next. In particular, the obstruction caused by the one or more labels may heavily influence the spectral responses, such as from various viewpoints, given that the one or more labels may appear on a back side and thus may affect light transmission received at a front side.

Moreover, pre-screening apparatus of an automated diagnostic analysis system and associated characterization method performed therein should be computationally efficient and cost effective.

Accordingly, in a first broad aspect, embodiments of this disclosure provide methods and apparatus configured to determine a presence and, in some embodiments, a degree of HILN using a deep adaptation network (DAN) executing on a computer. The DAN may include a classification network, a transformation network, and a segmentation/classification/regression network (SCN). The classification network may receive one or more images of a specimen container that includes a specimen and may determine whether the specimen includes a serum portion or a plasma portion of the specimen. In some embodiments, the classification network may also determine whether the specimen container includes an uncentrifuged specimen. In response to the classification network determining that the specimen container includes a serum portion, the image(s) thereof are received by the transformation network. The transformation network transforms the pixel data of the serum portion image into "transformed-pixel data" of an image that matches pixel data of a previously-collected image of a plasma portion having an appearance that corresponds to an appearance of the serum portion. The transformation network may modify one or more of pixel data color, contrast, intensity, and/or brightness of the serum portion image to match the appearance of a previously-collected plasma portion image deemed by the transformation network to correspond to the appearance of the serum portion. The "transformed-pixel data" may then be received by the SCN for processing. The SCN is configured to determine an HILN (hemolytic, icteric, lipemic, and normal) category of the "transformed-pixel data" of the serum portion. In some embodiments, the SCN may also be configured to determine specimen container and cap type information and/or container segmentation information, as described further below. In response to the classification network determining that the specimen container includes a plasma portion, the image(s) thereof are received by the SCN for processing in the same manner as for the "transformed-pixel data" of the serum portion to determine an HILN category of the plasma portion and, in some embodiments, to also determine specimen container and cap type information and/or container segmentation information.

Advantageously, the classification and transformation networks allow an SCN to be used that has only been trained with images of plasma portion specimen samples. This may avoid the labor intensive, time consuming, and expensive process of collecting and manually annotating a large volume of images of serum portion specimen samples to be used in training an SCN. Moreover, extraction of serum samples is generally more expensive than the extraction of plasma samples. Thus, the DAN according to embodiments described herein may significantly reduce the costs associated therewith by providing HILN determinations for both plasma and serum samples with an SCN trained with only plasma sample images.

Further details of inventive characterization methods and apparatus (e.g., quality check modules configured to carry out the characterization methods, and specimen testing systems including one or more quality check modules) will be further described with reference to FIGS. 1-8 herein.

Figure 2:
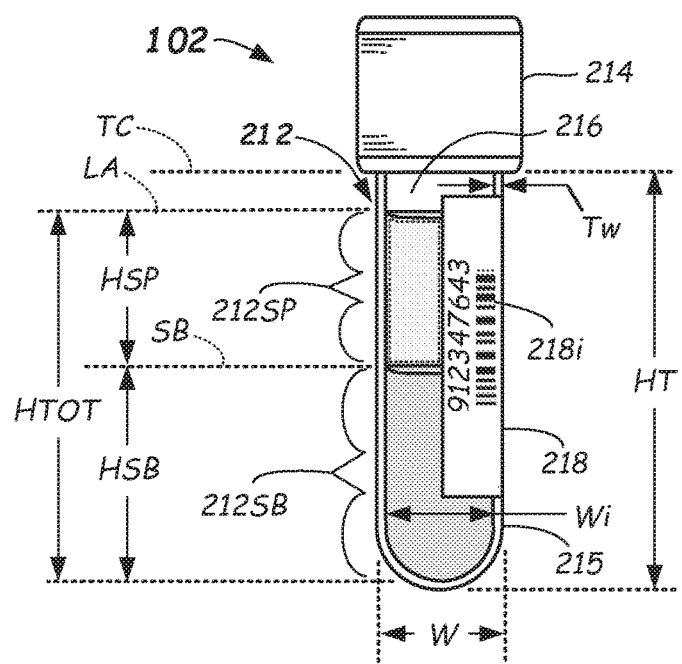
FIG. 2 illustrates a side view of a labeled specimen container including a separated specimen with a serum or plasma portion containing an interferent.
Figures 3A, 3B:
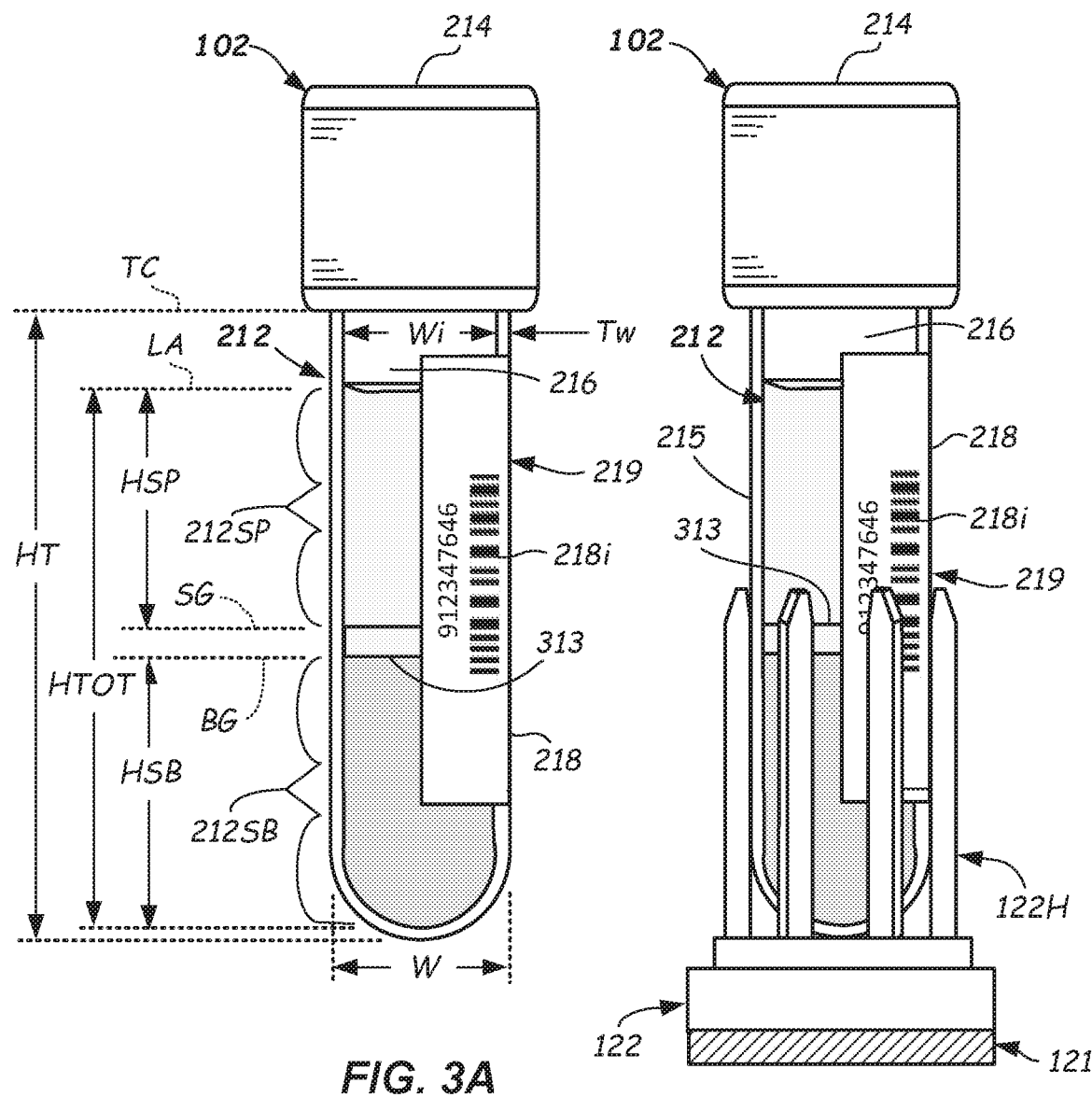
FIG. 3A illustrates a side view of a specimen container including a label, a separated specimen including a serum or plasma portion containing an interferent, and a gel separator therein.
FIG. 3B illustrates a side view of the specimen container of FIG. 3A held in an upright orientation in a holder.
Figure 3C:
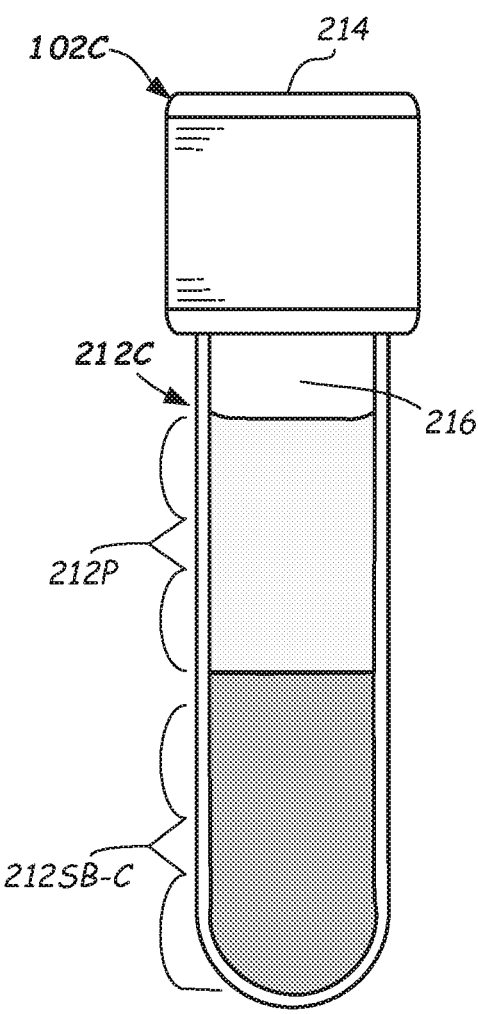
FIG. 3C illustrates a side view of a specimen container containing a plasma portion.
Figure 3D:
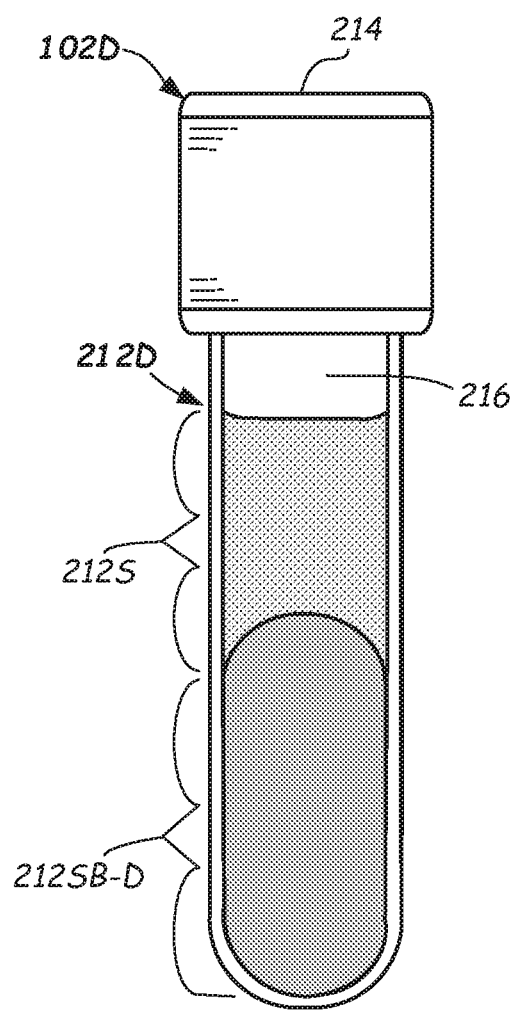
FIG. 3D illustrates a side view of a specimen container containing a serum portion.

FIG. 1 illustrates a specimen testing apparatus 100 capable of automatically processing multiple specimen containers 102 containing specimens 212 (see, e.g., FIGS. 2-3D). The specimen containers 102 may be provided in one or more racks 104 at a loading area 105 prior to transportation to, and analysis by, one or more analyzers (e.g., first analyzer 106, second analyzer 108, and/or third analyzer 110) arranged about the specimen testing apparatus 100. More or less numbers of analyzers may be used. The analyzers may be any combination of clinical chemistry analyzers and/or assaying instruments, or the like. The specimen containers 102 may be any suitably transparent or translucent container, such as a blood collection tube, test tube, sample cup, cuvette, or other clear or opaque glass or plastic container capable of containing and allowing imaging of the specimen 212 contained therein. The specimen containers 102 may be varied in size.

Specimens 212 (FIGS. 2-3D) may be provided to the specimen testing apparatus 100 in the specimen containers 102, which may be capped with a cap 214. The caps 214 may be of different types and/or colors (e.g., red, royal blue, light blue, green, grey, tan, yellow, or color combinations), which may have meaning in terms of what test the specimen container 102 is used for, the type of additive included therein, whether the container includes a gel separator, or the like. Other colors may be used. In one embodiment, the cap type may be determined by the characterization method described herein.

Each of the specimen containers 102 may be provided with a label 218, which may include identification information 218i (i.e., indicia) thereon, such as a barcode, alphabetic, numeric, or combination thereof. The identification information 218i may be machine readable at various locations about the specimen testing apparatus 100. The machine readable information may be darker (e.g., black) than the label material (e.g., white paper) so that it can be readily imaged. The identification information 218i may indicate, or may otherwise be correlated, via a Laboratory Information System (LIS) 147, to a patient's identification as well as tests to be performed on the specimen 212. The identification information 218i may indicate other or additional information. Such identification information 218i may be provided on the label 218, which may be adhered to or otherwise provided on an outside surface of the tube 215. As shown in FIG. 2, the label 218 may not extend all the way around the specimen container 102 or all along a length of the specimen container 102 such that from the particular front viewpoint shown, a large part of the serum or plasma portion 212SP is viewable (the part shown dotted) and unobstructed by the label 218.

However, in some embodiments, multiple labels 218 may have been provided (such as from multiple facilities that have handled the specimen container 102), and they may overlap each other to some extent. For example, two labels (e.g., a manufacturer's label and a barcode label) may be provided and may be overlapping and may occlude (obstruct) some or all of one or more viewpoints. Thus, it should be understood that in some embodiments, although the label(s) 218 may occlude some portion of the specimen 212 (an occluded portion), some portion of the specimen 212 and serum and plasma portion 212SP may still be viewable from at least one viewpoint (an un-occluded portion). Thus, in accordance with another aspect of the disclosure, embodiments of the DAN configured to carry out the characterization method can be trained to recognize the occluded and un-occluded portions, such that improved HILN detection may be provided.

Again referring to FIG. 2, the specimen 212 may include the serum or plasma portion 212SP and a settled blood portion 212SB contained within the tube 215. Air 216 may be provided above the serum and plasma portion 212SP and a line of demarcation between them is defined as the liquid-air interface (LA). The line of demarcation between the serum or plasma portion 212SP and the settled blood portion 212SB is defined as a serum-blood interface (SB). An interface between the air 216 and cap 214 is defined as a tube-cap interface (TC). The height of the tube (HT) is defined as a height from a bottom-most part of the tube 215 to a bottom of the cap 214, and may be used for determining tube size. A height of the serum or plasma portion 212SP is (HSP) and is defined as a height from a top of the serum or plasma portion 212SP to a top of the settled blood portion 212SB. A height of the settled blood portion 212SB is (HSB) and is defined as a height from the bottom of the settled blood portion 212SB to a top of the settled blood portion 212SB at SB. HTOT is a total height of the specimen 212 and equals HSP plus HSB.

In cases where a gel separator 313 is used (FIG. 3A), the height of the serum or plasma portion 212SP is (HSP) and is defined as a height from the top of the serum or plasma portion 212SP at LA to the top of the gel separator 313 at SG, wherein SG is an interface between the serum or plasma portion 212SP and the gel separator 313. A height of the settled blood portion 212SB is (HSB) and is defined as a height from the bottom of the settled blood portion 212SB to the bottom of the gel separator 313 at BG, wherein BG is an interface between the settled blood portion 212SB and the gel separator 313. HTOT is the total height of the specimen 212 and equals HSP plus HSB plus height of the gel separator 313. In each case, Tw is a wall thickness, W is an outer width, which may also be used for determining the size of the specimen container 102, and Wi is an inner width of the specimen container 102.

In more detail, specimen testing apparatus 100 may include a base 120 (FIG. 1) (e.g., a frame, floor, or other structure) upon which a track 121 may be mounted. The track 121 may be a railed track (e.g., a mono rail or a multiple rail), a collection of conveyor belts, conveyor chains, moveable platforms, or any other suitable type of conveyance mechanism. Track 121 may be circular or any other suitable shape and may be a closed track (e.g., endless track) in some embodiments. Track 121 may, in operation, transport individual ones of the specimen containers 102 to various locations spaced about the track 121 in carriers 122.

Carriers 122 may be passive, non-motored pucks that may be configured to carry a single specimen container 102 on the track 121, or optionally, an automated carrier including an onboard drive motor, such as a linear motor that is programmed to move about the track 121 and stop at pre-programmed locations. Other configurations of carrier 122 may be used. Carriers 122 may each include a holder 122H (FIG. 3B) configured to hold the specimen container 102 in a defined upright position and orientation. The holder 122H may include a plurality of fingers or leaf springs that secure the specimen container 102 on the carrier 122, but some may be moveable or flexible to accommodate different sizes of the specimen containers 102. In some embodiments, carriers 122 may leave from the loading area 105 after being offloaded from the one or more racks 104. The loading area 105 may serve a dual function of also allowing reloading of the specimen containers 102 from the carriers 122 to the loading area 105 after pre-screening and/or analysis is completed.

A robot 124 may be provided at the loading area 105 and may be configured to grasp the specimen containers 102 from the one or more racks 104 and load the specimen containers 102 onto the carriers 122, such as onto an input lane of the track 121. Robot 124 may also be configured to reload specimen containers 102 from the carriers 122 to the one or more racks 104. The robot 124 may include one or more (e.g., at least two) robot arms or components capable of X (lateral) and Z (vertical—out of the page, as shown), Y and Z, X, Y, and Z, or r (radial) and theta (rotational) motion. Robot 124 may be a gantry robot, an articulated robot, an R-theta robot, or other suitable robot wherein the robot 124 may be equipped with robotic gripper fingers oriented, sized, and configured to pick up and place the specimen containers 102.

Upon being loaded onto track 121, the specimen containers 102 carried by carriers 122 may progress to a first pre-processing station 125. For example, the first pre-processing station 125 may be an automated centrifuge configured to carry out fractionation of the specimen 212. Carriers 122 carrying specimen containers 102 may be diverted to the first pre-processing station 125 by inflow lane or other suitable robot. After being centrifuged, the specimen containers 102 may exit on outflow lane, or otherwise be removed by a robot, and continue along the track 121. In the depicted embodiment, the specimen container 102 in carrier 122 may next be transported to a quality check module 130 to carry out pre-screening, as will be further described herein with reference to FIGS. 4A-8 herein.

The quality check module 130 is configured to pre-screen and carry out the characterization methods described herein, and is configured to automatically determine a presence of and, in some embodiments, an extent or degree of H, I, and/or L contained in a specimen 212 or whether the specimen is normal (N). If found to contain effectively-low amounts of H, I and/or L, so as to be considered normal (N), the specimen 212 may continue on the track 121 and may then be analyzed by the one or more analyzers (e.g., first, second, and/or third analyzers 106, 108, and/or 110). Thereafter, the specimen container 102 may be returned to the loading area 105 for reloading to the one or more racks 104.

In some embodiments, in addition to detection of HILN, segmentation of the specimen container 102 and specimen 212 may take place. From the segmentation data, post processing may be used for quantification of the specimen 212 (i.e., determination of HSP, HSB, HTOT, and determination of locations of SB or SG, and LA). In some embodiments, characterization of the physical attributes (e.g., size—height and width/diameter) of the specimen container 102 may take place at the quality check module 130. Such characterization may include determining HT and W, and possibly TC, and/or Wi. From this characterization, the size of the specimen container 102 may be extracted. Moreover, in some embodiments, the quality check module 130 may also determine cap type, which may be used as a safety check and may catch whether a wrong tube type has been used for the test ordered.

In some embodiments, a remote station 132 may be provided on the specimen testing apparatus 100 that is not directly linked to the track 121. For instance, an independent robot 133 (shown dotted) may carry specimen containers 102 containing specimens 212 to the remote station 132 and return them after testing/pre-processing. Optionally, the specimen containers 102 may be manually removed and returned. Remote station 132 may be used to test for certain constituents, such as a hemolysis level, or may be used for further processing, such as to lower a lipemia level through one or more additions and/or through additional processing, or to remove a clot, bubble or foam, for example. Other pre-screening using the HILN detection methods described herein may be accomplished at remote station 132.

Additional station(s) may be provided at one or more locations on or along the track 121. The additional station(s) may include a de-capping station, aliquoting station, one or more additional quality check modules 130, and the like.

The specimen testing apparatus 100 may include a number of sensors 116 at one or more locations around the track 121. Sensors 116 may be used to detect a location of specimen containers 102 on the track 121 by means of reading the identification information 218i, or like information (not shown) provided on each carrier 122. Any suitable means for tracking the location may be used, such as proximity sensors. All of the sensors 116 may interface with the computer 143, so that the location of each specimen container 102 may be known at all times.

The pre-processing stations and the analyzers 106, 108, and 110 may be equipped with robotic mechanisms and/or inflow lanes configured to remove carriers 122 from the track 121, and with robotic mechanisms and/or outflow lanes configured to reenter carriers 122 to the track 121.

Specimen testing apparatus 100 may be controlled by the computer 143, which may be a microprocessor-based central processing unit CPU, having a suitable memory and suitable conditioning electronics and drivers for operating the various system components. Computer 143 may be housed as part of, or separate from, the base 120 of the specimen testing apparatus 100. The computer 143 may operate to control movement of the carriers 122 to and from the loading area 105, motion about the track 121, motion to and from the first pre-processing station 125 as well as operation of the first pre-processing station 125 (e.g., centrifuge), motion to and from the quality check module 130 as well as operation of the quality check module 130, and motion to and from each analyzer 106, 108, 110 as well as operation of each analyzer 106, 108, 110 for carrying out the various types of testing (e.g., assay or clinical chemistry).

For all but the quality check module 130, the computer 143 may control the specimen testing apparatus 100 according to software, firmware, and/or hardware commands or circuits such as those used on the Dimension® clinical chemistry analyzer sold by Siemens Healthcare Diagnostics Inc. of Tarrytown, New York, and such control is typical to those skilled in the art of computer-based electromechanical control programming and will not be further described herein. However, other suitable systems for controlling the specimen testing apparatus 100 may be used. The control of the quality check module 130 may also be provided by the computer 143, but in accordance with the inventive characterization methods described in detail herein.

The computer 143 used for image processing and to carry out the characterization methods described herein may include a CPU or GPU, sufficient processing capability and RAM, and suitable storage. In one example, the computer 143 may be a multi-processor-equipped PC with one or more GPUs, 8 GB Ram or more, and a Terabyte or more of storage. In another example, the computer 143 may be a GPU-equipped PC, or optionally a CPU-equipped PC operated in a parallelized mode. MKL could be used as well, 8 GB RAM or more, and suitable storage.

Embodiments of the disclosure may be implemented using a computer interface module (CIM) 145 that allows a user to easily and quickly access a variety of control and status display screens. These control and status display screens may display and enable control of some or all aspects of a plurality of interrelated automated devices used for preparation and analysis of specimens 212. The CIM 145 may be employed to provide information about the operational status of a plurality of interrelated automated devices as well as information describing the location of any specimen 212, as well as a status of tests to be performed on, or being performed on, the specimen 212. The CIM 145 is thus adapted to facilitate interactions between an operator and the specimen testing apparatus 100. The CIM 145 may include a display screen operative to display a menu including icons, scroll bars, boxes, and buttons through which the operator may interface with the specimen testing apparatus 100. The menu may comprise a number of function elements programmed to display and/or operate functional aspects of the specimen testing apparatus 100.

FIGS. 3C and 3D illustrate visual differences between a specimen container 102C containing a specimen 212C that includes a plasma portion 212P (FIG. 3C) and a specimen container 102D containing a specimen 212D that includes a serum portion 212S (FIG. 3D). Note that plasma portion 212P and serum portion 212S are the fluid portions of the specimen. As shown, the characteristics and appearance of the serum portion 212S varies slightly from the characteristics and appearance of the plasma portion 212P. However, the settled blood portion 212SB-D of the specimen 212D including the serum portion 212S is distinguishable from the settled blood portion 212SB-C of the specimen 212C including the plasma portion 212P. The hill-like region of the settled blood portion 212SB-D results from serum samples (e.g., specimen 212D) containing blood clotting factors such as fibrinogen, which plasma samples (e.g., specimen 212C) do not contain.

Figure 4A:
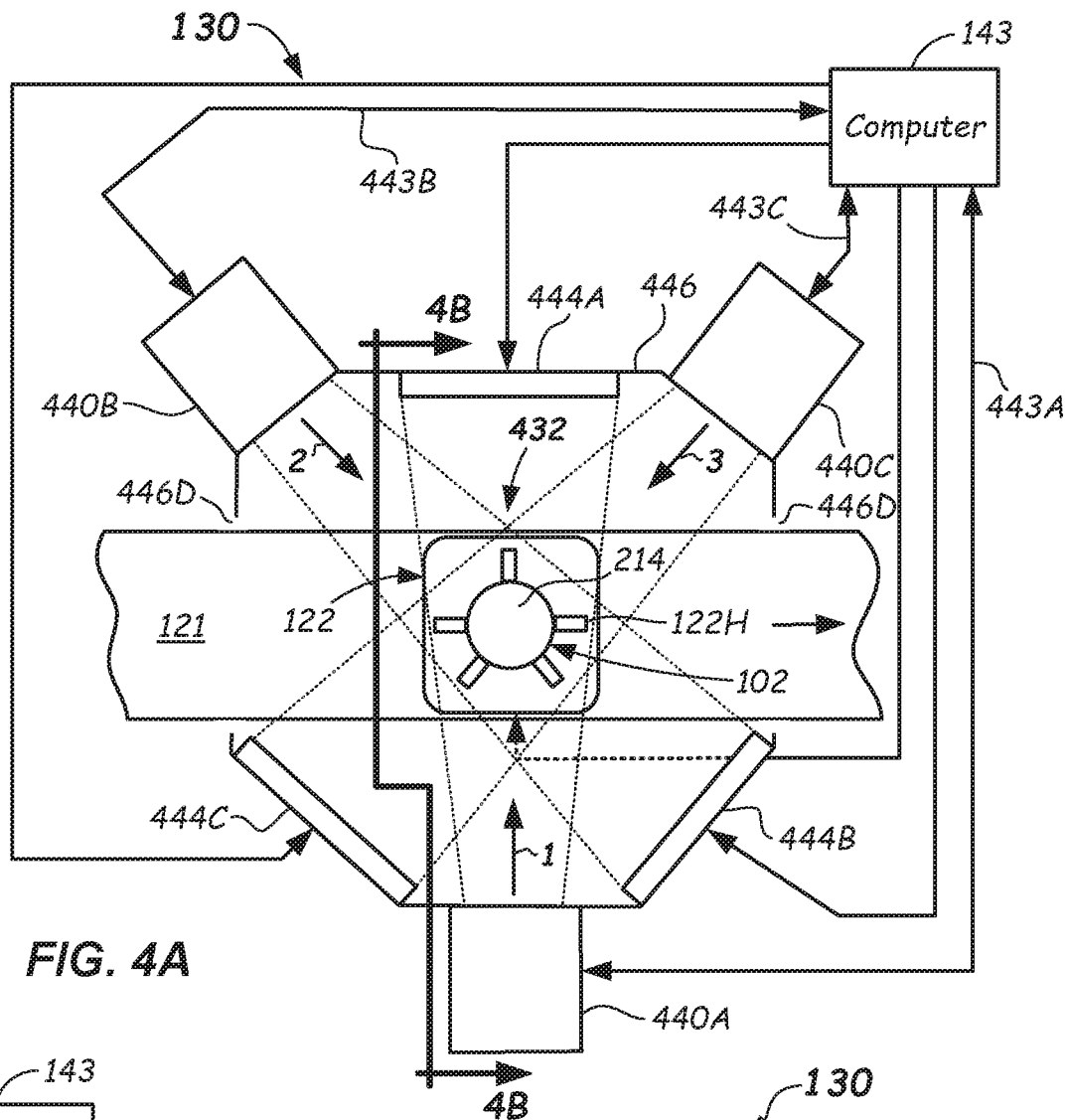
FIG. 4A illustrates a schematic top view of a quality check module (with top removed) including multiple viewpoints and configured to capture and analyze multiple backlit images to enable a determination of a presence and degree of an interferent according to one or more embodiments.
Figure 4B:
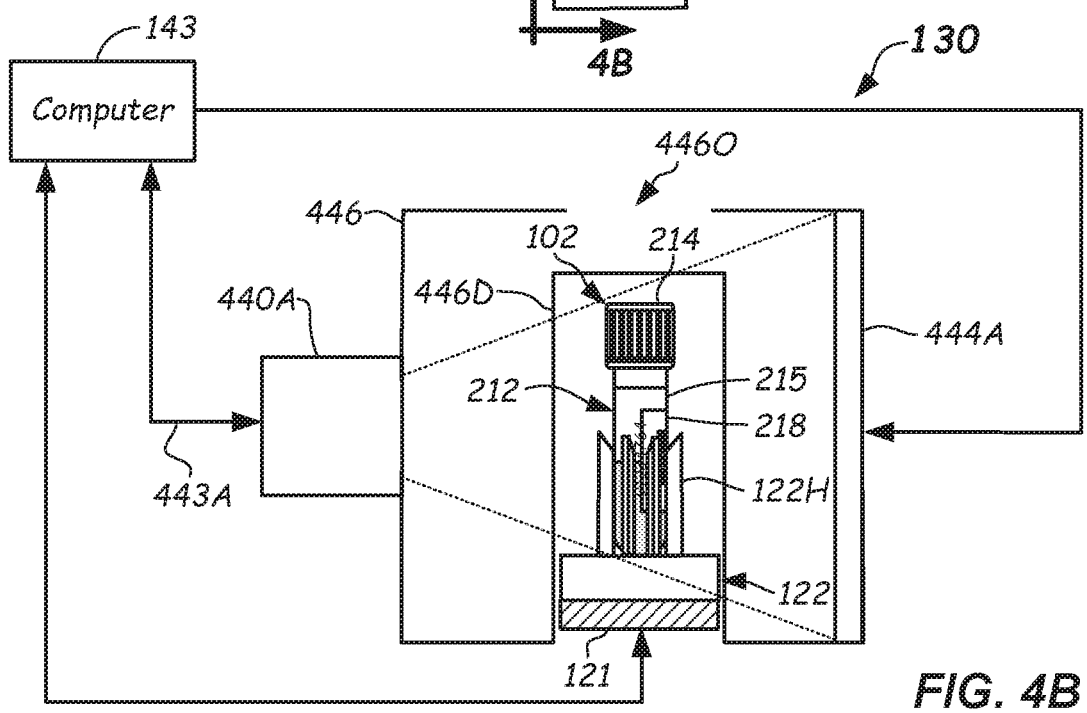
FIG. 4B illustrates a schematic side view of the quality check module (with front enclosure wall removed) of FIG. 4A taken along section line 4B-4B of FIG. 4A according to one or more embodiments.

FIGS. 4A and 4B show an embodiment of a quality check module 130 configured to carry out the characterization methods as shown and described herein. Quality check module 130 may be configured to pre-screen for a presence and, in some embodiments, a degree of an interferent (e.g., H, I, and/or L) in a specimen 212 (e.g., in a serum or plasma portion 212SP thereof) prior to analysis by the one or more analyzers 106, 108, 110. Pre-screening in this manner allows for additional processing, additional quantification or characterization, and/or discarding and/or redrawing of a specimen 212 without wasting valuable analyzer resources or possibly having the presence of an interferent affect the veracity of test results.

In addition to the interferent detection methods described herein, other detection methods may take place on the specimen 212 contained in the specimen container 102 at the quality check module 130. For example, a method may be carried out at the quality check module 130 to provide segmentation as an output from the DAN. The segmentation data may be used in a post processing step to quantify the specimen 212, i.e., determine certain physical dimensional characteristics of the specimen 212 (e.g., LA and SB, and/or determination of HSP, HSB, and/or HTOT). Quantification may also involve estimating, e.g., a volume of the serum or plasma portion (VSP) and/or a volume of the settled blood portion (VSB). Other quantifiable geometrical features may also be determined.

Furthermore, the quality check module 130 may be used to quantify geometry of the specimen container 102, i.e., quantify certain physical dimensional characteristics of the specimen container 102, such as the location of TC, HT, and/or W or Wi of the specimen container 102.

Referring to FIGS. 1, 4A, and 4B, the quality check module 130 may include multiple image capture devices 440A-440O. Three image capture devices 440A-440C are shown and are preferred, but optionally two or four or more can be used. Image capture devices 440A-440O may be any suitable device for capturing well-defined digital images, such as conventional digital cameras capable of capturing a pixelated image, charged coupled devices (CCD), an array of photodetectors, one or more CMOS sensors, or the like. For example, the three image capture devices 440A, 440B, 440C are illustrated in FIG. 4A and are configured to capture images from three different lateral viewpoints (viewpoints labeled 1, 2, and 3). The captured image size may be, e.g., about 2560×694 pixels. In another embodiment, the image capture devices 440A, 440B, 440C may capture an image size that may be about 1280×387 pixels, for example. Other image sizes and pixel densities may be used.

Each of the image capture devices 440A, 440B, 440C may be configured and operable to capture lateral images of at least a portion of the specimen container 102, and at least a portion of the specimen 212. For example, the image capture devices 440A-440O may capture a part of the label 218 and part or all of the serum or plasma portion 212SP. In some instances, e.g., part of a viewpoint 1-3 may be partially occluded by label 218. In some embodiments, one or more of the viewpoints 1-3 may be fully occluded, i.e., no clear view of the serum or plasma portion 212SP may be possible. However, even in cases where a side (front side or back side) of a viewpoint 1-3 is fully occluded by one or more labels 218, the characterization method may still be able to distinguish the boundaries of the serum or plasma portion 212SP through the one or more occluding labels 218.

In the embodiment shown, the plurality of image capture devices 440A, 440B, 440C are configured to capture lateral images of the specimen container 102 and specimen 212 at an imaging location 432 from the multiple viewpoints 1-3. The viewpoints 1-3 may be arranged so that they are approximately equally spaced from one another, such as about 120° from one another, as shown. As depicted, the image capture devices 440A, 440B, 440C may be arranged around the track 121. Other arrangements of the plurality of image capture devices 440A, 440B, 440C may be used. In this way, the images of the specimen 212 in the specimen container 102 may be taken while the specimen container 102 is residing in the carrier 122 at the imaging location 432. The field of view of the multiple images obtained by the image capture devices 440A, 440B, 440C may overlap slightly in a circumferential extent.

In one or more embodiments, the carriers 122 may be stopped at a pre-determined location in the quality check module 130, such as at the imaging location 432, i.e., such as at a point where normal vectors from each of the image capture devices 440A, 440B, 440C intersect each other. A gate or the linear motor of the carrier 122 may be provided to stop the carriers 122 at the imaging location 432, so that multiple quality images may be captured thereat. In an embodiment where there is a gate at the quality check module 130, one or more sensors (like sensors 116) may be used to determine the presence of a carrier 122 at the quality check module 130.

The image capture devices 440A, 440B, 440C may be provided in close proximity to and trained or focused to capture an image window at the imaging location 432, wherein the image window is an area including an expected location of the specimen container 102. Thus, the specimen container 102 may be stopped so that it is approximately located in a center of the view window in some embodiments. Within the images captured, one or more reference datum may be present.

In operation of the quality check module 130, each image may be triggered and captured responsive to a triggering signal provided in communication lines 443A, 443B, 443C that may be sent by the computer 143. Each of the captured images may be processed by the computer 143 according to one or more embodiments. In one particularly effective method, high dynamic range (HDR) processing may be used to capture and process the image data from the captured images. In more detail, multiple images are captured of the specimen 212 at the quality check module 130 at multiple different exposures (e.g., at different exposure times), while being sequentially illuminated at one or more different spectra. For example, each image capture device 440A, 440B, 440C may take 4-8 images of the specimen container 102 including the serum or plasma portion 212SP at different exposure times at each of multiple spectra. For example, 4-8 images may be taken by image capture device 440A at viewpoint 1 while the specimen 212 is backlit illuminated with light source 444A that has a red spectrum. Additional like images may be taken sequentially at viewpoints 2 and 3.

In some embodiments, the multiple spectral images may be accomplished using different light sources 444A-444C emitting different spectral illumination. The light sources 444A-444C may back light the specimen container 102 (as shown). A light diffuser may be used in conjunction with the light sources 444A-444C in some embodiments. The multiple different spectra light sources 444A-444C may be RGB light sources, such as LEDs emitting nominal wavelengths of 634 nm+/−35 nm (Red), 537 nm+/−35 nm (Green), and 455 nm+/−35 nm (Blue). In other embodiments, the light sources 444A-444C may be white light sources. In cases where the label 218 obscures multiple viewpoints, IR backlighting or NIR backlighting may be used. Furthermore, RGB light sources may be used in some instances even when label occlusion is present. In other embodiments, the light sources 444A-444C may emit one or more spectra having a nominal wavelength between about 700 nm and about 1200 nm.

By way of a non-limiting example, to capture images at a first wavelength, three red light sources 444A-444C (wavelength of about 634 nm+/−35 nm) may be used to sequentially illuminate the specimen 212 from three lateral locations. The red illumination by the light sources 444A-444C may occur as the multiple images (e.g., 4-8 images or more) at different exposure times are captured by each image capture device 440A-440O from each viewpoint 1-3. In some embodiments, the exposure times may be between about 0.1 ms and 256 ms. Other exposure times may be used. In some embodiments, each of the respective images for each image capture device 440A-440O may be taken sequentially, for example. Thus, for each viewpoint 1-3, a group of images are sequentially obtained that have red spectral backlit illumination and multiple (e.g., 4-8 exposures, such as different exposure times). The images may be taken in a round robin fashion, for example, where all images from viewpoint 1 are taken followed sequentially by viewpoints 2 and 3.

In each embodiment, the quality check module 130 may include a housing 446 that may at least partially surround or cover the track 121 to minimize outside lighting influences. The specimen container 102 may be located inside the housing 446 during the image-taking sequences. Housing 446 may include one or more doors 446D to allow the carriers 122 to enter into and/or exit from the housing 446. In some embodiments, the ceiling may include an opening 446O to allow a specimen container 102 to be loaded into the carrier 122 by a robot including moveable robot fingers from above.

Once the red illuminated images are captured in the embodiment of FIGS. 4A-4B, another spectra of light, for example, green spectral light sources 444A-444C may be turned on (nominal wavelength of about 537 nm with a bandwidth of about +/−35 nm), and multiple images (e.g., 4-8 or more images) at different exposure times may be sequentially captured by each image capture device 440A, 440B, 440C. This may be repeated with blue spectral light sources 444A-444C (nominal wavelength of about 455 nm with a bandwidth of about +/−35 nm) for each image capture devices 440A, 440B, 440C. The different nominal wavelength spectral light sources 444A-444C may be accomplished by light panels including banks of different desired spectral light sources (e.g., R, G, B, W, IR, and/or NIR) that can be selectively turned on and off, for example. Other means for backlighting may be used.

The multiple images taken at multiple exposures (e.g., exposure times) for each respective wavelength spectra may be obtained in rapid succession, such that the entire collection of backlit images for the specimen container 102 and specimen 212 from multiple viewpoints 1-3 may be obtained in less than a few seconds, for example. In one example, four different exposure images for each wavelength at three viewpoints 1-3 using the image capture devices 440A, 440B, 440C and back lighting with RGB light sources 444A-444C will result in 4 images×3 spectra×3 image capture devices=36 images. In another example, 4 different exposure images for each wavelength at three viewpoints using the image capture devices 440A, 440B, 440C and back lighting with R, G, B, W, IR, and NIR light sources 444A-444C will result in 4 images×6 spectra×3 cameras=72 images.

According to embodiments of the characterization methods, the processing of the image data may involve a pre-processing step including, for example, selection of optimally-exposed pixels from the multiple captured images at the different exposure times at each wavelength spectrum and for each image capture device 440A-440C, so as to generate optimally-exposed image data for each spectrum and for each viewpoint 1-3. This is referred to as "image consolidation" herein.

For each corresponding pixel (or patch), for each of the images from each image capture device 440A-440C, pixels (or patches) exhibiting optimal image intensity may be selected from each of the different exposure images for each viewpoint 1-3. In one embodiment, optimal image intensity may be pixels (or patches) that fall within a predetermined range of intensities (e.g., between 180-254 on a scale of 0-255), for example. In another embodiment, optimal image intensity may be between 16-254 on a scale of 0-255), for example. If more than one pixel (or patch) in the corresponding pixel (or patch) locations of two exposure images is determined to be optimally exposed, the higher of the two may be selected.

The selected pixels (or patches) exhibiting optimal image intensity may be normalized by their respective exposure times. The result is a plurality of normalized and consolidated spectral image data sets for the illumination spectra (e.g., R, G, B, white light, IR, and/or IR—depending on the combination used) and for each image capture device 440A-440C where all of the pixels (or patches) are optimally exposed (e.g., one image data set per spectrum) and normalized. In other words, for each viewpoint 1-3, the data pre-processing carried out by the computer 143 may result in a plurality of optimally-exposed and normalized image data sets, one for each illumination spectra employed.

Figure 5:
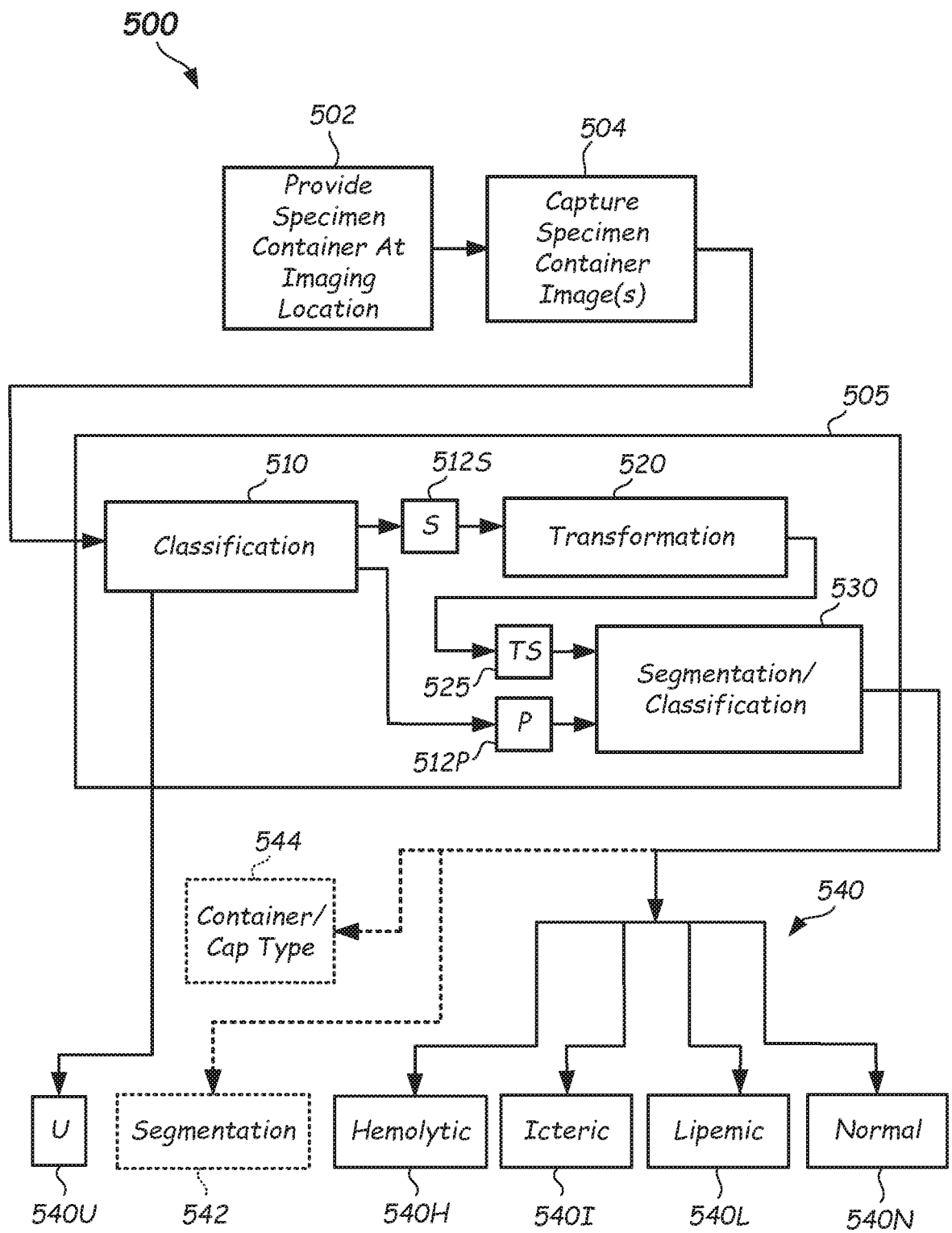
FIG. 5 illustrates a functional block diagram of a quality check module that includes a deep adaptation network (DAN) operative to output an interferent category of a serum or plasma portion of a specimen contained in a specimen container according to one or more embodiments.

FIG. 5 shows functional components 500 configured to carry out the HILN characterization methods described herein. Functional components 500 may be embodied as a quality check module 130 controlled by the computer 143. As discussed above, a specimen container 102 may be provided at the imaging location 432 (FIGS. 4A and 4B) of the quality check module 130, as indicated in functional block 502. Multi-view images may be captured as indicated in functional block 504 by the plurality of image capture devices 440A-440O. The image data for each of the multi-view, multi-spectral, multi-exposure images may be pre-processed as discussed above to provide a plurality of optimally-exposed and normalized pixel data sets. Pixel data of one or more images of a specimen container may be provided as input to a deep adaptation network (DAN) 505.

The DAN 505 may include a classification network 510, a transformation network 520, and a segmentation/classification/regression network (SCN) 530 according to embodiments. The classification network 510 and the transformation network 520 may form a front-end processing block of DAN 505, wherein computer-executable instructions thereof may be stored in a first tangible computer readable medium, while SCN 530 may form a back-end processing block of DAN 505, wherein computer-executable instructions thereof may be stored in a second tangible computer readable medium. In some embodiments, an alternative DAN 905 of FIG. 9 (described further below) may provide just transformation followed by SCN 530 (i.e., classification network 510 may be omitted). That is, images of the input specimen, regardless of whether it contains a plasma or serum sample, may be input directly to a transformation network 920, which may transform the input data to minimize appearance differences between serum and plasma portions, while maintaining the HILN characteristics of the specimen for processing in SCN 530.

The classification network 510 may receive one or more images of a specimen container containing a specimen and may determine whether the specimen container includes a serum portion or a plasma portion of the specimen. As shown in FIGS. 3C and 3D, serum samples may be visually distinguishable from plasma samples, and classification network 510 is configured (e.g., trained via appropriately annotated images) to identify one or more distinguishable features (e.g., the hill-like region of the settled blood portion 212SB-D of specimen 212D, which includes serum portion 212S as shown in FIG. 3D). In some embodiments, the classification network 510 may also determine whether the specimen container includes an uncentrifuged specimen, wherein the classification network 510 may output an uncentrifuged specimen category 540U via, e.g., CIM 145 (FIG. 1). In response to the classification network 510 determining that the specimen container includes a serum portion, the pixel data of the serum portion image 512S are received by the transformation network 520. In response to the classification network 510 determining that the specimen container includes a plasma portion, the pixel data of the plasma portion image 512P are received by SCN 530. Classification network 510 may be of any suitable architecture, such as, e.g., LeNet, AlexNet, ResNet or DenseNet, configured to focus on classification to distinguish serum samples from plasma samples. In some embodiments, classification network 510 may be a classical machine learning algorithm, such as, e.g., SVM (Support Vector Machine), random forest, or logistic sigmoid.

The transformation network 520 transforms the pixel data of the serum portion image 512S into "transformed-pixel data" 525 that matches identically or substantially identically pixel data of a previously-collected image of a plasma portion having an appearance that corresponds to an appearance of the serum portion. The transformation network may modify one or more of pixel data color, contrast, intensity, and/or brightness of the serum portion image to match the appearance of a previously-collected plasma portion image deemed by the transformation network to correspond to the appearance of the serum portion. The correspondence may be based on samples of serum and plasma that have substantially similar, if not identical, HILN characteristics. The training of transformation network 520 to transform serum sample images to corresponding plasma sample images advantageously requires far fewer serum sample images to be collected and annotated than the expected hundreds of thousands of serum sample images that would typically be needed to train a segmentation/classification/regression network, such as the SCN 530, to suitably characterize serum samples.

Figure 9:
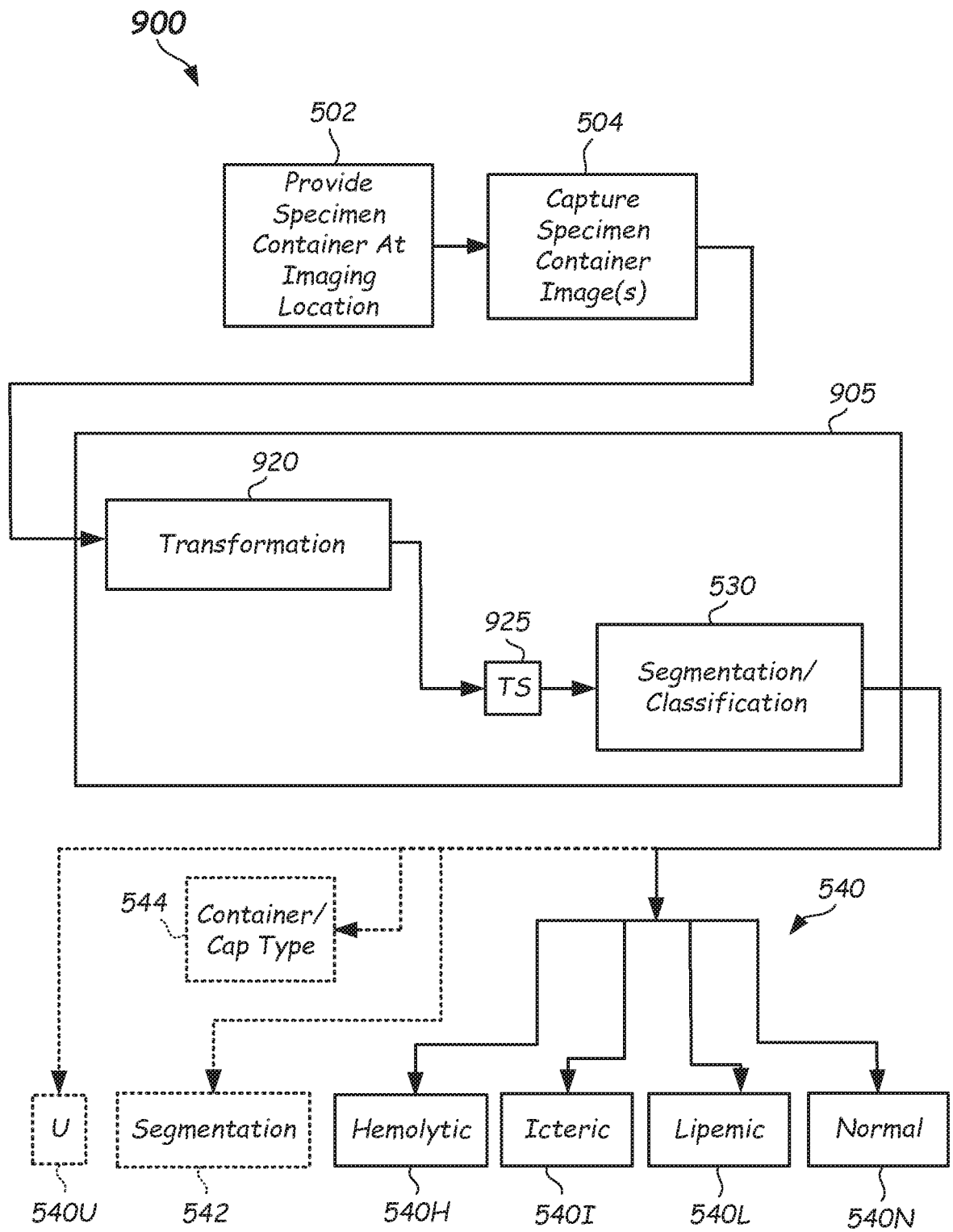
FIG. 9 illustrates a functional block diagram of a quality check module that includes an alternative deep adaptation network (DAN) operative to output an interferent category of a serum or plasma portion of a specimen contained in a specimen container according to one or more embodiments.

In some embodiments, e.g., as shown in FIG. 9, regardless of whether plasma or serum samples are provided as input, transformation network 920 may directly receive and transform the images of an input sample into "transformed-pixel data" 925 wherein plasma and serum appearance differences are normalized/minimized, but HILN characteristics of the fluid would remain unaffected. The training of transformation network 920 to perform the normalization/minimization of serum and plasma appearance differences may be based on samples of serum and plasma that have substantially similar, if not identical, HILN characteristics. Functional components 900 may be embodied as a quality check module 130 controlled by the computer 143.

Transformation networks 520 and 920 may be of any suitable architecture and may be, e.g., a generative adversarial network (GAN) (examples include but are not limited to CycleGAN or Pix2Pix), a convolutional neural network (CNN), or a variational autoencoder (VAE). In some embodiments, transformation network 520 and/or 920 may also provide some noise removal, if required, from the pixel data of the images processed therein. The samples may come from different apparatus of different age and manufacturers and may tend to have some kind of noise caused either by their calibration, aging hardware materials, light exposures, and so on. The transformation network 520 and/or 920 may have the capability of removing or normalizing any noise present in the input samples, regardless of whether a serum or plasma sample. The "transformed-pixel data" 525 and 925 generated by the transformation network 520 and 920, respectively, may be received by the SCN 530 for processing.

The SCN 530 is configured to determine an HILN (hemolytic, icteric, lipemic, and normal) category 540 (e.g., 540H, 540I, 540L, or 540N) for each image having pixel data processed therein including, e.g., the pixel data of the plasma portion image 512P and the transformed-pixel data 525 of the serum portion image 512S. Note that the pixel data of the plasma portion image 512P and the transformed-pixel data 525 of the serum portion image 512S are processed in the same manner in SCN 530. In some embodiments, the SCN 530 may also be configured to determine specimen container segmentation information 542 and/or container and cap type information 544, as described above in connection with FIGS. 2-3B. Note that SCN 530 may advantageously need to be trained with only plasma sample images, saving significant time and cost in its development. SCN 530 may be any suitable classification, segmentation, or regression network, such as, e.g., a Tiramisu network (e.g., a fully convolutional neural network having 100 layers), capable of processing an input image to determine an HILN category.

Figure 6:
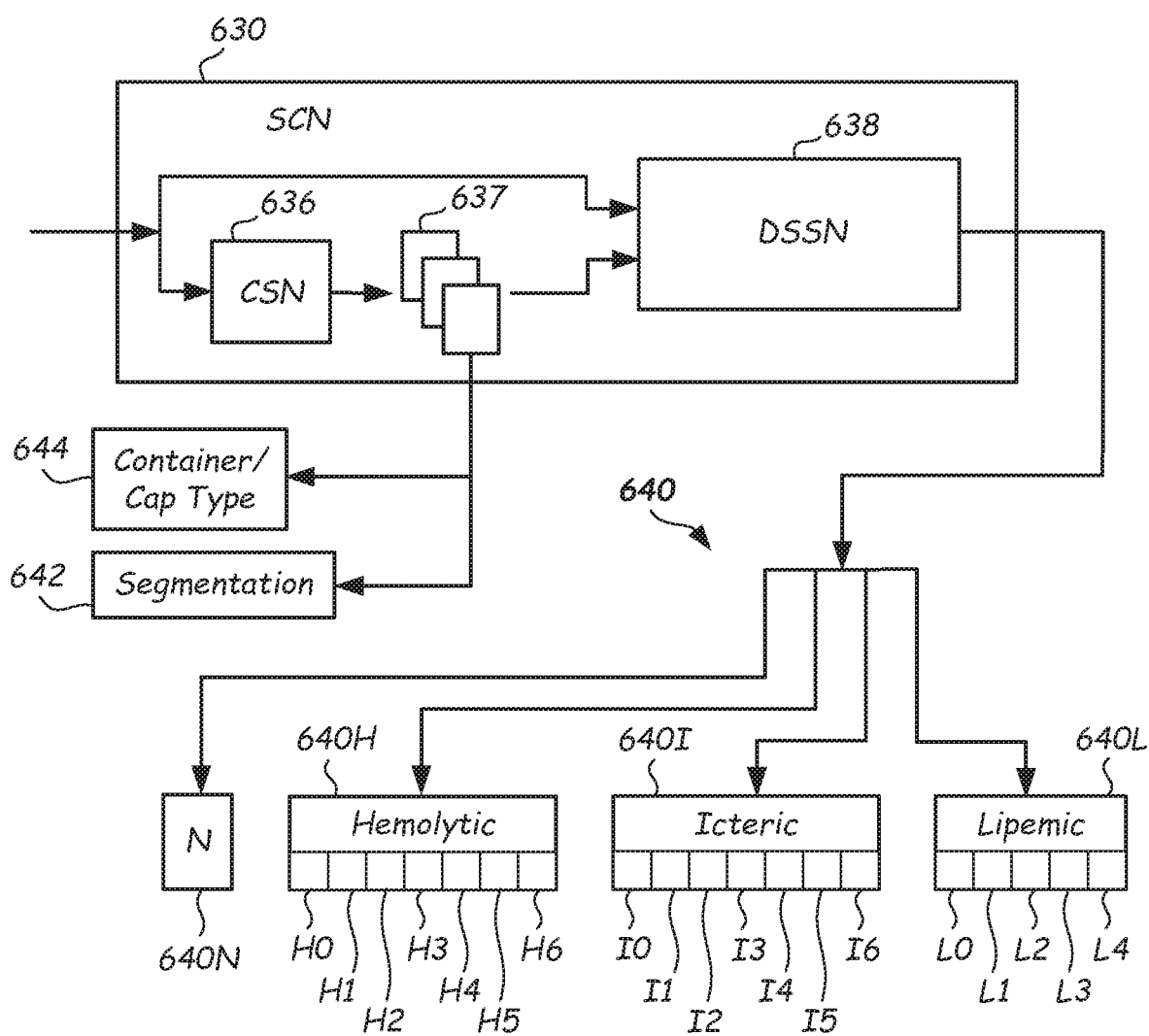
FIG. 6 illustrates a functional block diagram of the segmentation/classification network of the DAN of FIG. 5 according to one or more embodiments.

FIG. 6 shows an example embodiment of the SCN 530 according to embodiments. Segmentation/classification/regression network (SCN) 630 is configured to provide an HILN classification index, and may be embodied as part of a quality check module 130 controlled by the computer 143. SCN 630 may include a small container segmentation network (CSN) 636 at a front end of a deep semantic segmentation network (DSSN) 638. The CSN 636 may be configured and operative to determine container/cap type and container segmentation information 637. The CSN 636 may provide detailed characterization of a specimen container, such as, e.g., specimen container 102. This includes, e.g., separation of the specimen container from its background, understanding of the serum or plasma portion's content, and segmentation of any labels affixed to the specimen container. The container/cap type and container segmentation information 637 may be input via an additional input channel to the DSNN 638 and, in some embodiments, the CSN 636 may provide segmentation output 642 and container/cap type output 644 via, e.g., CIM 145 (FIG. 1). In some embodiments, the CSN 636 may have a similar network structure as the DSSN 638, but shallower (i.e., with far fewer layers).

DSSN 638 includes, in some embodiments, more than 100 operational layers and performs pixel-level classification. A benefit of having such a deep network is that it may increase the network reception field, which utilizes more context information rather than small local regions. Given an input image (i.e., pixel data), the DSSN 638 is operative to assign a classification index to each pixel of the image based on its local appearance as indicated by its pixel data value. The extracted pixel index information can be further processed by the DSSN 638 to determine a final HILN classification index.

As shown in FIG. 6, an output of the SCN 630 may be a classification index category 640 that, in some embodiments, may include a normal class 640N, a hemolytic class 640H, an icteric class 640I, and a lipemic class 640L. In some embodiments, hemolytic class 640H may include sub-classes H0, H1, H2, H3, H4, H5, and H6. Icteric class 640I may include sub-classes I0, I1, I2, I3, I4, I5, and I6. And lipemic class 640L may include sub-classes L0, L1, L2, L3, and L4. Each of hemolytic class 640H, icteric class 640I, and/or lipemic class 640L may have, in other embodiments, other numbers of fine-grained sub-classes.

Figure 7:
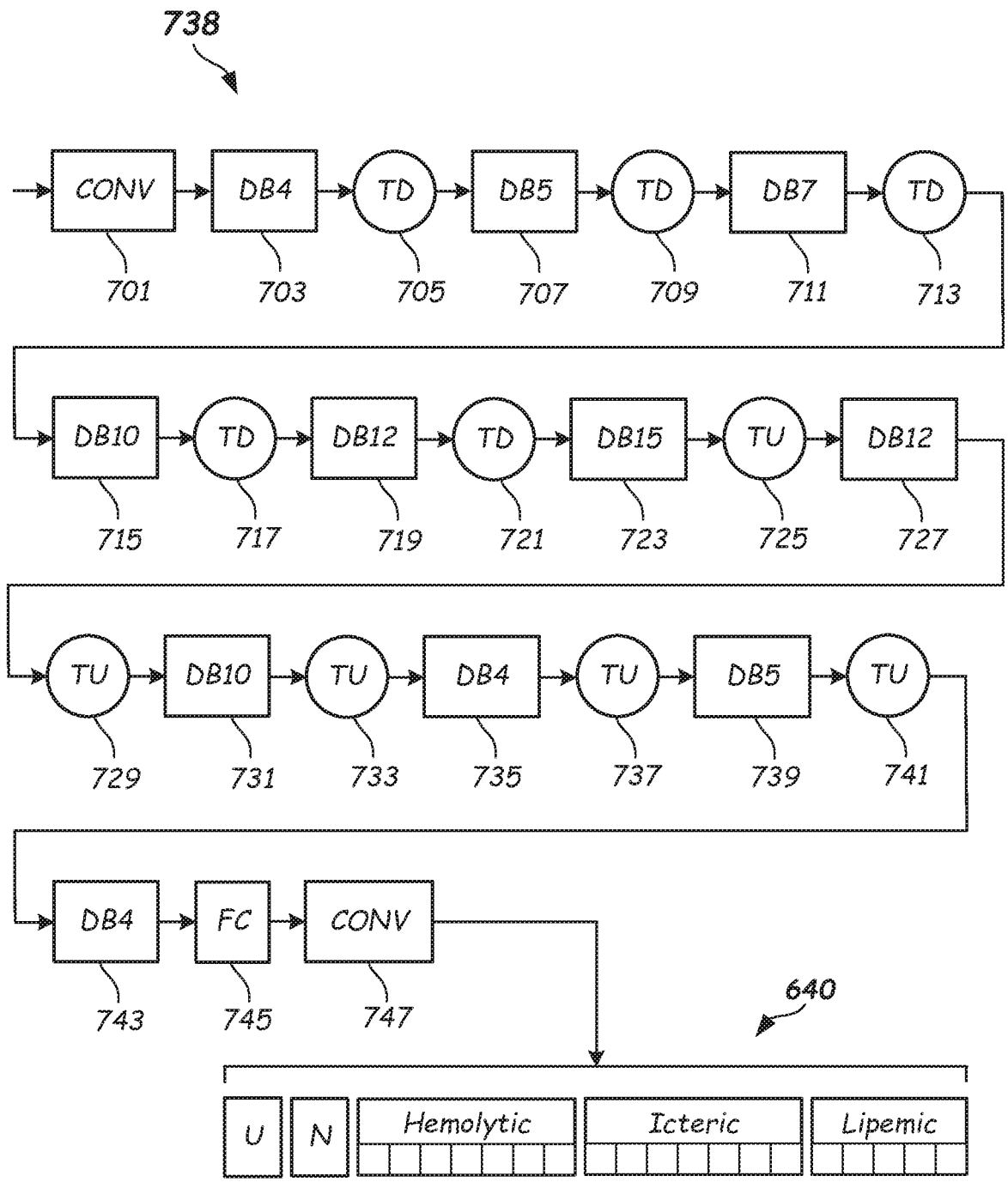
FIG. 7 illustrates a block diagram of an architecture of the segmentation/classification network of FIG. 6 according to one or more embodiments.

FIG. 7 illustrates an example architecture 738 of DSSN 638 in accordance with one or more embodiments. DSSN 638 may be coded using any suitable scientific computing framework, program, or toolbox, such as, for example, Caffe available from Berkley Vision and Learning Center (BVLC), Theano, a Python framework for fast computation of mathematical expressions, TensorFlow, Torch, and the like. Architecture 738 may include the following operational layers: two convolutional (CONV) layers 701 and 747; eleven dense block layers DB4 703, DB5 707, DB7 711, DB10 715, DB12 719, DB15 723, DB12 727, DB10 731, DB4 735, DB5 739, and DB4 743; five transition down layers TD 705, TD 709, TD 713, TD 717, and TD 721; five transition up layers TU 725, TU 729, TU 733, TU 737, and TU 741, and a fully connected layer 745 arranged as shown in FIG. 7, wherein classification index 540 is output.

Each of dense block layers DB4 703, 735, and 743 may include four dense layers. Each of dense block layers DB5 707 and 739 may include five dense layers. Dense block layer DB7 711 may include seven dense layers. Each of dense block layers DB10 715 and 731 may include ten dense layers. Each of dense block layers DB12 719 and 727 may include twelve dense layers. And dense block layer DB15 723 may include fifteen dense layers. Each dense layer may include a batch normalization operation, an ReLU layer, and a 3×3 convolutional layer with dropout p=0.2, wherein a first dense layer receives an input and outputs a number of pixel label maps, which are concatenated to the input. A second dense layer then receives the concatenated output as its input and outputs a number of pixel label maps, which are again concatenated to the previous pixel label maps. This may be repeated for each dense layer in the dense block layer.

Each transition down layer TD 705, TD 709, TD 713, TD 717, and TD 721 may include a batch normalization operation, followed by an ReLu layer, followed by a 3×3 convolutional layer with dropout p=0.2, followed by a 2×2 max pooling layer. Note that the dropout probability may range from 0 to 1 depending on the experimental test runs that result in the best outcome. In some embodiments, the number of pixel label maps at the output of TD 705 may be 112, at the output of TD 709 may be 192, at the output of TD 713 may be 304, at the output of TD 717 may be 464, and at the output of TD 721 may be 656. Other numbers of pixel label maps that may be output are possible in other embodiments.

Each transition up layer TU 725, TU 729, TU 733, TU 737, and TU 741 may include in this embodiment a 3×3 transposed convolutional layer with stride 2. Other transition up layer parameters may be possible.

In some embodiments, the number of pixel label maps at the output of DB15 723 may be 896, at the output of DB12 727 may be 1088, at the output of DB10 731 may be 816, at the output of DB4 735 may be 578, at the output of DB5 739 may be 384, and at the output of DB4 743 may be 256. Other numbers of pixel label maps that may be output are possible in other embodiments.

As used herein, a convolution layer is a processing step that may apply a filter (also referred to as a kernel) to input image data (e.g., pixel intensity values) to output an activation map that may indicate detection of some specific type of color or feature (e.g., from a simple curve after application of a first convolution layer to somewhat more complex features after application of several convolution layers) at some spatial position in the input image data.

A max pooling layer is a processing step that may apply a filter to generate output activation maps having maximum pixel values appearing in the one or more activation maps received from a convolutional layer.

A ReLU (rectified linear unit) layer is a processing step that may apply a nonlinear function to all values in a received activation map resulting in, e.g., all negative activation values being assigned a value of zero.

A fully connected layer is a processing step that aggregates previous activation maps (each of which may indicate detection of lower level features) to indicate detection of higher-level features.

A softmax layer is typically a final processing step that outputs a probability distribution highlighting or identifying the most likely feature of one or more images from a class of image features.

The SCN 630 combines several different solutions to overcome at least the above-described challenges brought about by the complex imaging environment of specimen container characterization (performed at, e.g., quality check module 130). As described herein, the SCN 630 advantageously includes several convolutional neural networks for characterization (CSN 636 and DSSN 638). Specimen container images created by hardware at quality check module 130 and processed by classification network 510 and, in some cases by transformation network 520, may be input to the SCN 630, which may be executed on computer 143. A classification index category 640 of a serum or plasma portion of a specimen within the specimen container may be output from the SCN 630, which may then be used for further analysis as described above.

Figure 8:
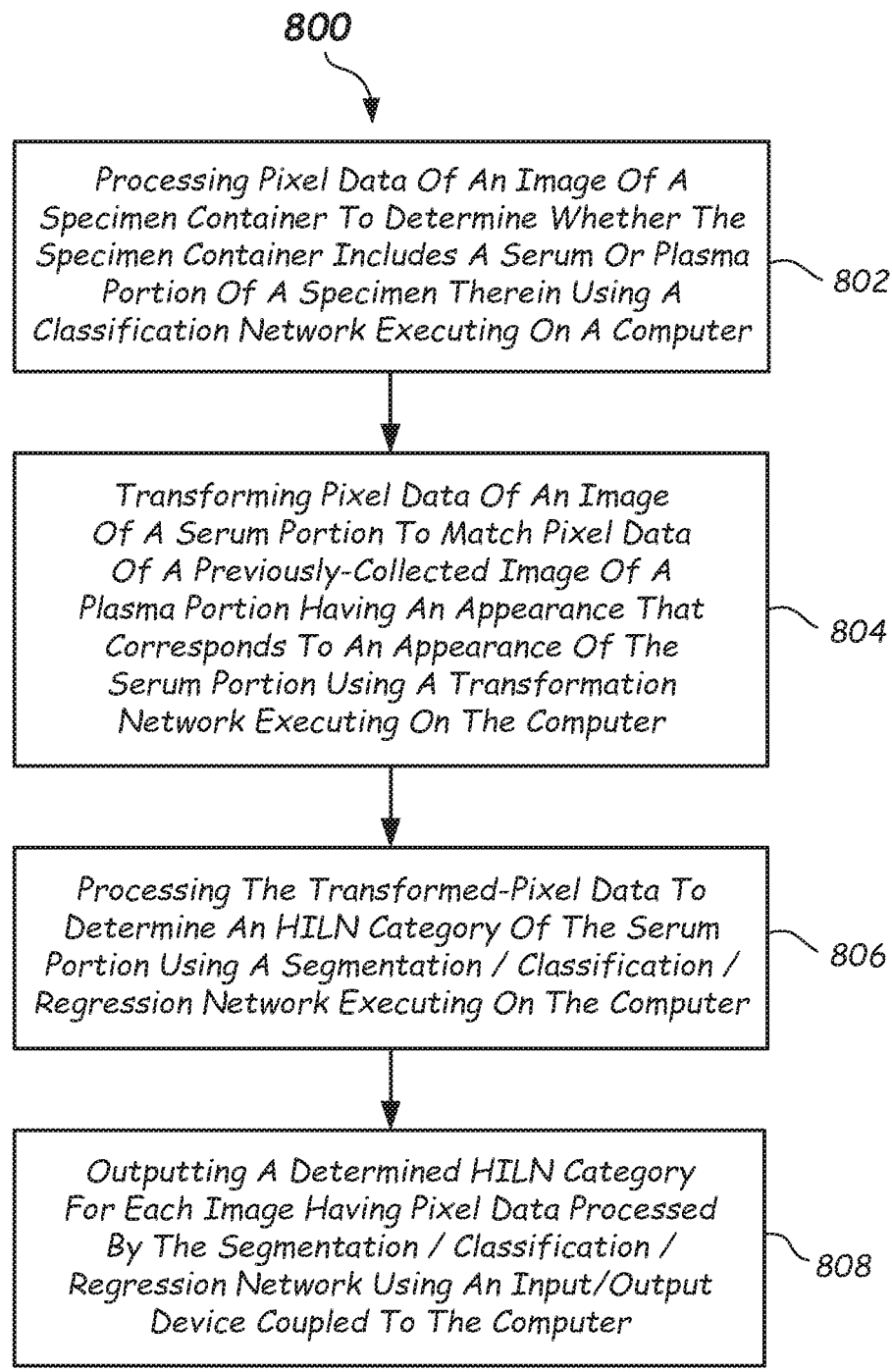
FIG. 8 is flowchart of a method of characterizing a specimen container according to one or more embodiments.

FIG. 8 illustrates a flowchart of a method 800 of characterizing a specimen container according to one or more embodiments of the disclosure. Method 800 may be carried out by a quality check module 130 and/or a specimen testing apparatus 100 that includes a quality check module 130 as described herein. In particular, method 800 may determine a presence of an interferent in a serum or plasma portion of a specimen (such as specimen 212, 212C, or 212D of FIGS. 2-3D) and, in some embodiments may determine a degree of the interferent present in the specimen. Method 800 may include, in process block 802, processing pixel data of an image of a specimen container containing a specimen therein to determine whether the specimen container includes a serum portion or a plasma portion using a classification network executing on a computer. The image may be captured by an image capture device (e.g., one of image capture devices 440A-4400) and may be of, e.g., specimen container 102). The specimen container may include a plasma portion 212P (FIG. 3C) or a serum portion 212S (FIG. 3D) of a specimen therein. The classification network may be classification network 510 executing on computer 143.

Method 800 may also include, in process block 804, transforming pixel data of an image determined by the classification network to include a serum portion into "transformed-pixel data" that matches pixel data of a previously-collected image of a plasma portion having an appearance that corresponds to an appearance of the serum portion using a transformation network executing on the computer. The transformation network may be transformation network 520 executing on computer 143, and the transforming may include modifying pixel data color, contrast, intensity, or brightness of the serum portion image.

In process block 806, method 800 may include processing the transformed-pixel data to determine an HILN category of the serum portion using a segmentation/classification/regression network executing on the computer. The segmentation/classification/regression network may be SCN (segmentation/classification network/regression) 530 or 630 executing on the computer 143.

Method 800 may also include, in process block 808, outputting from the segmentation/classification/regression network a determined HILN (hemolytic, icteric, lipemic, and normal) category for each image having pixel data processed by the segmentation/classification/regression network using an interface module coupled to the computer. The interface module may be CIM (computer interface module) 145 (FIG. 1). The determined HILN category may be, e.g., one of 540H, 540I, 540L, or 540N (FIG. 5). In some embodiments, a classification index category 640 (FIG. 6) may be outputted, which in some embodiments may include the following classes (and sub-classes): 640N, 640H (H0, H1, H2, H3, H4, H5, H6), 640I (I0, I1, I2, I3, I4, I5, I6), and 640L (L0, L1, L2, L3, and L4). In some embodiments, a network can regress/output HIL concentrations values of an input sample.

In some embodiments, method 800 may further include processing pixel data of an image determined by the classification network to include a plasma portion to determine an HILN (hemolytic, icteric, lipemic, and normal) category of the plasma portion using the segmentation/classification/regression network executing on the computer. For example, referring to FIG. 5, the pixel data of the plasma portion image 512P may be received from classification network 510 and processed by SCN 530.

In addition to outputting an HILN category, method 800 may include, in some embodiments, outputting from the segmentation/classification/regression network information regarding specimen container segmentation and/or the type of specimen container and/or the type of specimen container cap (see, e.g., FIG. 5, SCN 530, specimen container segmentation information 542 and specimen container/cap type information 544).

In some embodiments, method 800 may also include processing the pixel data of the image of the specimen container using the classification network executing on the computer to determine whether the specimen container includes an uncentrifuged specimen (see, e.g., FIG. 5, classification network 510 and uncentrifuged specimen category output 540U).

While the disclosure is susceptible to various modifications and alternative forms, specific method and apparatus embodiments have been shown by way of example in the drawings and are described in detail herein. It should be understood, however, that the particular methods and apparatus disclosed herein are not intended to limit the disclosure but, to the contrary, to cover all modifications, equivalents, and alternatives falling within the scope of the claims.

What is claimed is:

1. A method of characterizing a specimen container, comprising:
   processing pixel data of an image of a specimen container containing a specimen therein to determine whether the specimen container includes a serum portion or a plasma portion using a classification network executing on a computer; and
   transforming pixel data of an image determined by the classification network to include a serum portion into transformed-pixel data that matches pixel data of a previously-collected image of a plasma portion having an appearance that corresponds to an appearance of the serum portion without affecting any HILN (hemolytic, icteric, lipemic, and normal) characteristics present in the pixel data of the image using a transformation network executing on the computer.

2. The method of claim 1, further comprising:
   processing the transformed-pixel data to determine an HILN category of the serum portion using a segmentation/classification/regression network executing on the computer;
   processing pixel data of an image determined by the classification network to include a plasma portion to determine an HILN category of the plasma portion using the segmentation/classification/regression network executing on the computer; and
   outputting from the segmentation/classification/regression network a determined HILN category for each image having pixel data processed by the segmentation/classification/regression network using an interface module coupled to the computer.

3. The method of claim 2, wherein the segmentation/classification/regression network has been trained with only images of plasma samples.

4. The method of claim 2, wherein the outputting further comprises outputting from the segmentation/classification/regression network a classification index category comprising hemolytic, icteric, lipemic, and normal classes and sub-classes using the interface module coupled to the computer.

5. The method of claim 1, further comprising processing the pixel data of the image of the specimen container to determine whether the specimen container includes an uncentrifuged specimen using the classification network executing on the computer.

6. The method of claim 1, further comprising removing at least some noise from the pixel data of the image using the transformation network executing on the computer.

7. The method of claim 1, wherein the transforming comprises modifying pixel color, contrast, intensity, or brightness data of the image determined by the classification network to include the serum portion.

8. A quality check module, comprising:
   one or more image capture devices operative to capture one or more images from one or more viewpoints of a specimen container containing a specimen therein; and
   a computer coupled to the one or more image capture devices, the computer comprising an interface module and configured and operative to:
   process pixel data of a captured image of the specimen container to determine whether the specimen container includes a serum portion or a plasma portion using a classification network executing on the computer;
   transform pixel data of a captured image determined by the classification network to include a serum portion into transformed-pixel data that matches pixel data of a previously-collected image of a plasma portion having an appearance that corresponds to an appearance of the serum portion without affecting any HILN (hemolytic, icteric, lipemic, and normal) characteristics present in the pixel data of the image using a transformation network executing on the computer;
   process the transformed-pixel data to determine an HILN category of the serum portion using a segmentation/classification/regression network executing on the computer; and
   output from the segmentation/classification/regression network using the interface module a determined HILN category for each captured image having pixel data processed by the segmentation/classification/regression network.

9. The quality check module of claim 8, wherein the segmentation/classification/regression network has been trained with only images of plasma samples.

10. The quality check module of claim 8, wherein the computer is further configured and operative to process pixel data of a captured image determined by the classification network to include a plasma portion to determine an HILN category of the plasma portion using the segmentation/classification/regression network executing on the computer.

11. The quality check module of claim 8, wherein the computer is further configured and operative to output from the classification network using the interface module a determination that the specimen is uncentrifuged.

12. The quality check module of claim 8, wherein the computer is further configured and operative to output from the segmentation/classification/regression network using the interface module a classification index category comprising hemolytic, icteric, lipemic, and normal classes.

13. The quality check module of claim 12, wherein each of the hemolytic, icteric, and lipemic classes comprises five to seven sub-classes.

14. The quality check module of claim 8, wherein the computer is further configured and operative to transform the pixel data of the captured image by modifying pixel color, contrast, intensity, or brightness data of the captured image.

15. A specimen testing apparatus, comprising:
   a track;
   a carrier moveable on the track and configured to contain a specimen container containing a specimen therein;
   a plurality of image capture devices arranged around the track and operative to capture one or more images from one or more viewpoints of the specimen container and the specimen; and
   a computer coupled to the plurality of image capture devices, the computer comprising an interface module and configured and operative to:
   process pixel data of a captured image of the specimen container to determine whether the specimen container includes a serum portion or a plasma portion using a classification network executing on the computer;
   transform pixel data of a captured image determined by the classification network to include a serum portion into transformed-pixel data that matches pixel data of a previously-collected image of a plasma portion having an appearance that corresponds to an appearance of the serum portion without affecting any HILN (hemolytic, icteric, lipemic, and normal) characteristics present in the pixel data of the image using a transformation network executing on the computer;

process the transformed-pixel data to determine an HILN category of the serum portion using a segmentation/classification/regression network executing on the computer; and output from the segmentation/classification/regression network using the interface module a determined HILN category for each captured image having pixel data processed by the segmentation/classification/regression network.

16. The specimen testing apparatus of claim 15, wherein the segmentation/classification/regression network has been trained with only images of plasma samples.

17. The specimen testing apparatus of claim 15, wherein the computer is further configured and operative to transform the pixel data of the captured image by modifying pixel color, contrast, intensity, or brightness data of the captured image.

18. The specimen testing apparatus of claim 15, wherein the computer is further configured and operative to process pixel data of a captured image determined by the classification network to include a plasma portion to determine an HILN category of the plasma portion using the segmentation/classification/regression network executing on the computer.

19. The specimen testing apparatus of claim 15, wherein the computer is further configured and operative to output from the classification network using the interface module a determination that the specimen is uncentrifuged.

20. The specimen testing apparatus of claim 15, wherein the computer is further configured and operative to output from the segmentation/classification/regression network using the interface module a classification index category comprising hemolytic, icteric, lipemic, and normal classes and sub-classes.

21. A method of characterizing a specimen container, comprising:

transforming pixel data, using a transformation network executing on a computer, of an image of a specimen container into transformed-pixel data, the specimen container containing a specimen therein, the specimen having a serum portion or a plasma portion, the transformation network minimizing or normalizing appearance differences between images of serum portions and images of plasma portions without affecting any HILN (hemolytic, icteric, lipemic, and normal) characteristics present in the pixel data of the image.

* * * * *